Feb. 19, 1952      C. W. KELSEY      2,586,542
AUXILIARY ROTOR FOR TILLER GEAR CASINGS
Filed Sept. 12, 1947      2 SHEETS—SHEET 1
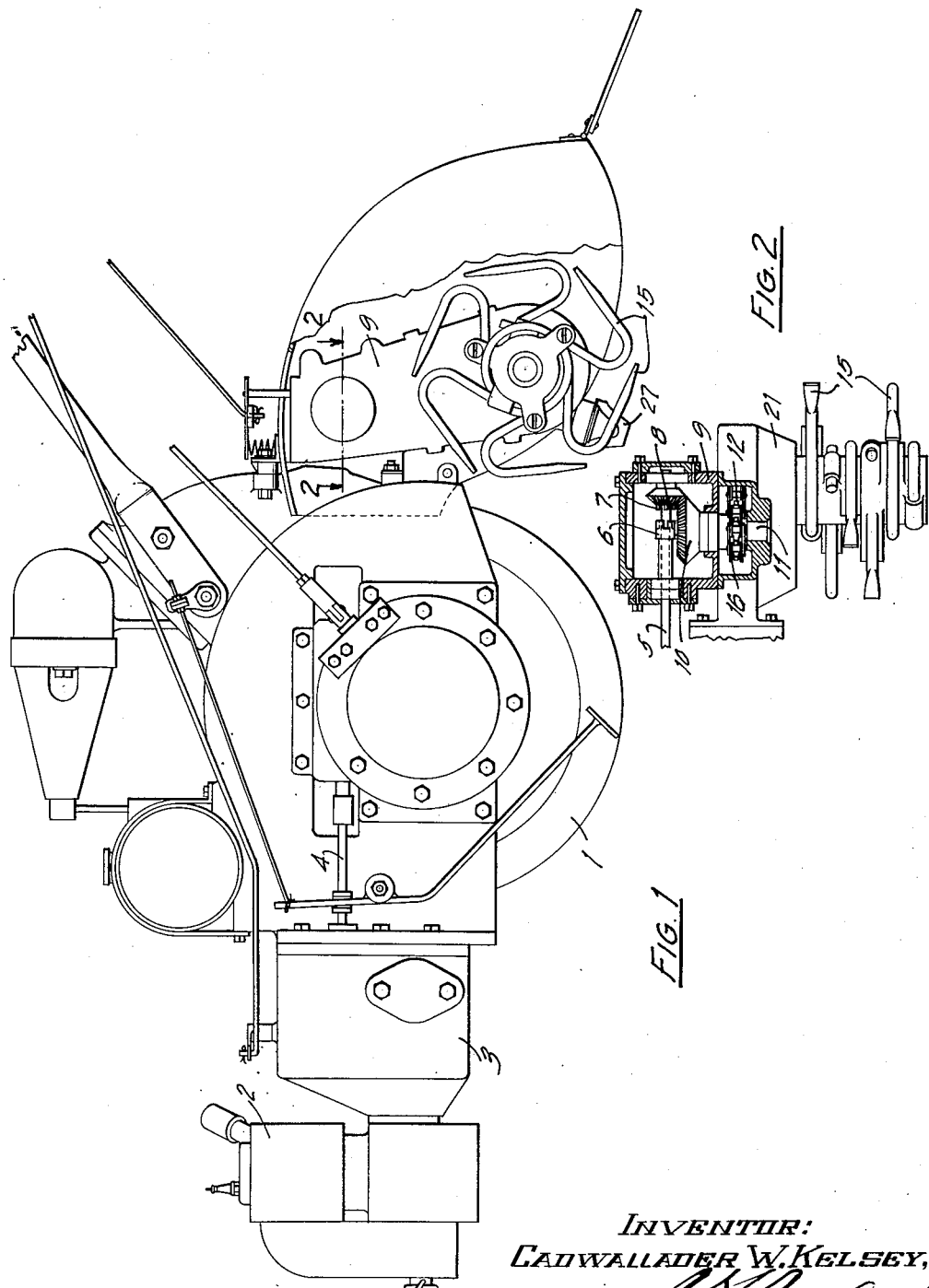
INVENTOR:
CADWALLADER W. KELSEY,
By
His Attorney.

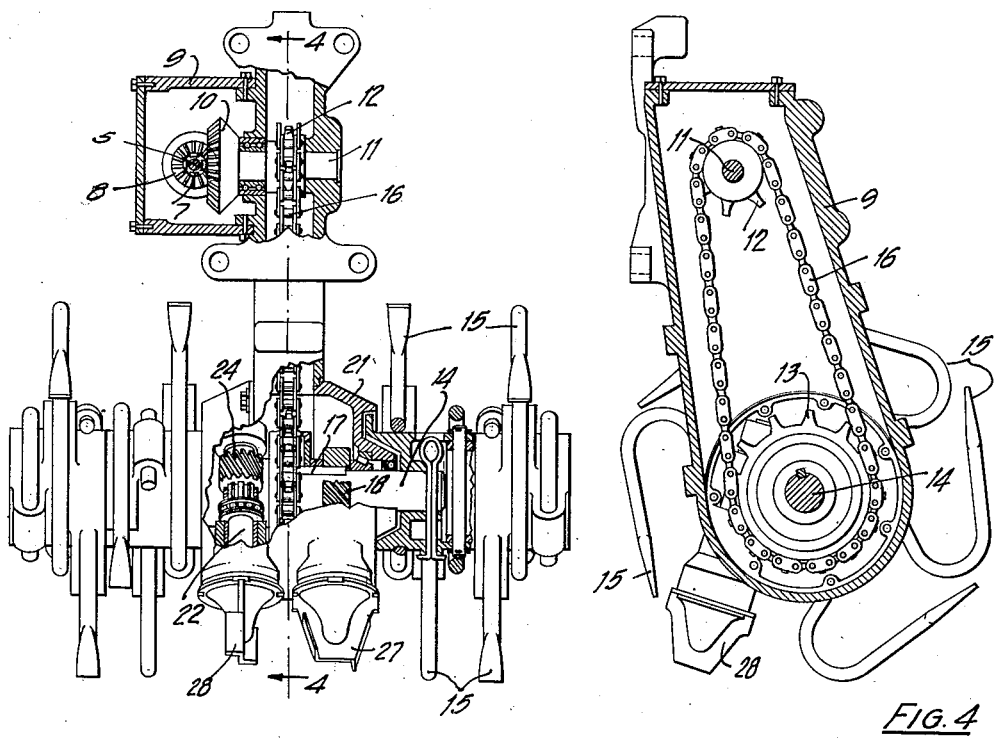

Patented Feb. 19, 1952

2,586,542

UNITED STATES PATENT OFFICE 2,586,542

AUXILIARY ROTOR FOR TILLER GEAR CASINGS

Cadwallader W. Kelsey, Troy, N. Y.

Application September 12, 1947, Serial No. 773,633

2 Claims. (Cl. 97—40)

My invention relates to rotary soil working apparatus and particularly to improvements in the device disclosed in my U. S. Letters Patent No. 2,366,626.

In soil working machines of the rotary type, there is a horizontal driven shaft which extends transversely of the machine on each side of centrally-disposed driving mechanism in very much the same way as the rear axle of a motor vehicle extends laterally each side of the differential mechanism. While there is no differential mechanism in a soil working machine, a central casing or housing is, nevertheless, required for the driving mechanism. Soil working tools are attached to the driven shaft at each side of the central housing and function to break up and pulverize the soil with which they come in contact. In order to work the soil in that zone or strip over which the central drive housing passes, the tools immediately adjacent the housing have sometimes been bent toward and partly over the housing so that at least a portion of the soil under each side of the housing is worked by these tools. However, since there must be a housing for a propeller shaft, chain, or other mechanism which connects the driven shaft with the source of power, there always remains some portion of the soil over which the center of the machine passes which cannot be worked by the tools attached to the transversely-extending driven shaft.

In order to overcome this objection I proposed, in my letters patent aforesaid, to provide a single, centrally-disposed tool, somewhat analogous to a drill, which is rotatably mounted on the drive housing for the soil working tools and which is driven by gears or other means from the transversely-extending driven shaft. This drill-like tool functions very well except that its reaction with the soil tends to twist or turn the soil working mechanism about the axis of the tool and, of course, in a direction opposite to that in which the tool rotates.

The principal object of my present invention is to provide a rotary soil working device having an improved means for working the soil passed over by the central portion of the device and which cannot be worked by tools mounted on the transversely-extending driven shaft, because they are and must be arranged in two groups substantially spaced from each other at each side of the mechanism which drives the shaft on which they are mounted. A further object is to provide an improved means of this character which, when in operation, will not tend to twist the apparatus in either direction. A still further object is to till the soil between the hook-like tools mounted on the transversely driven shaft so that the bottom of the casing can fall into the tilled area between the hook-like tools and prevent the latter from being lifted out of the ground during operation.

I accomplish these objects broadly by providing two oppositely rotating, drill-like tools which are disposed between the two main groups of tools aforesaid.

In the drawings—

Fig. 1 is a side elevation of a rotary soil working apparatus equipped with my invention;

Fig. 2 is a section of Fig. 1 in the plane 2—2 but showing only one of the two main groups of tools;

Fig. 3 is a front view of the soil working tools with certain portions broken away and certain portions in section;

Fig. 4 is a section of Fig. 3 in the plane 4—4;

Fig. 5 is an end view of Fig. 3 with certain portions broken away and other portions in section through the axis of one of the drill-like tools;

Fig. 6 is a view to an enlarged scale of the two drill-like tools shown in Figs. 1-5, inclusive, as projected on a plane perpendicular to the axes of the tools;

Fig. 7 is a fragmentary elevation view of a modified type of tool; and

Fig. 8 is a side view of the tool shown in Fig. 7.

Referring to the drawing—

I is the ground wheel on which the soil working apparatus is carried; 2 is the motor; 3 is a transmission housing from which driving shafts 4 and 5 (see Figs. 1, 2 and 3) extend toward the rear of the machine at each side of the ground wheel and from which said wheel is driven by worm gearing (not shown).

Referring particularly now to Figs. 2 and 3, the shaft 5 has a clutch collar 6 which rotates therewith but is slidably mounted thereon to engage the clutch member 7 on bevel pinion 8 which is rotatably mounted in the housing 9 and meshes with the bevel gear 10. Secured to the shaft 11 of bevel gear 10 is a sprocket 12 which drives the sprocket 13 attached to the driven shaft 14 on which the main groups of soil working tools 15 are mounted through chain 16.

Secured to the shaft 14 at each side of the sprocket 13 by means of keys 17 is a spiral gear, one of which is shown at 18 in Figs. 3 and 5. Mounted in bearings, such as shown at 19 and 20, in the housing 21 for the driving mechanism and on each side of the sprocket 13 are shafts 22 and 23, one of which is shown in Fig. 3 and the other of which is shown in Fig. 5. These shafts are downwardly and forwardly inclined, and splined thereto are spiral gears 24 and 25 which cooperate with the spiral gears aforesaid on shaft 14. The set of spiral gears by which shaft 22 is driven are designed to drive shaft 22 in a counter-clockwise direction as viewed from the lower end of said shaft, and the cooperating spiral gears which drive the shaft 23 are designed to turn said shaft in a clockwise direction when so viewed.

Threaded to the lower end of each of the shafts 22 and 23, as shown at 26 in Fig. 5, are soil working tools 27 and 28. These tools, of course, rotate in opposite directions, as shown by the curved arrows in Fig. 6; the straight arrow 29 indicating the direction in which the apparatus moves over the ground.

In Figs. 7 and 8, I have shown a modified type of tool which is provided with downwardly converging, serrated edges 30 and 31, and which is my preferred type of tool.

In each case, the tool comprises a flat, blade-like portion, such as shown at 32 in Fig. 6 and 33 in Figs. 7 and 8, and the blade-like portion of the one tool is attached to its shaft so that it is preferably at right angles to the blade-like portion of the other tool.

It will be apparent from the foregoing that, since the tools on the shafts 22 and 23 rotate in opposite directions, their reactions with the soil worked thereby are equal, opposite in direction, and therefore are balanced, so that there is no tendency to twist the soil working mechanism in either direction as is the case where a single tool is employed. Furthermore, since the tools rotate in opposite directions, which are away from, instead of towards, each other on the advancing side thereof, any stones or other obstructions which are encountered thereby, instead of being drawn between the tools, are thrown outwardly and away from between the tools; and, since the drill-like tools rotate in close proximity to the next adjacent tools which are connected to the shaft 14, the soil is thoroughly worked and broken up across the entire strip thereof with which the soil working tools come in contact.

What I claim is:

1. In a rotary soil working device, the combination with a casing having shaft-driving mechanism therein, of a shaft extending transversely through said casing and driven by said mechanism, a group of tools mounted on said shaft at each side of said casing, which tools extend radially from said shaft and rotate therewith, two separate soil-working tools, said separate tools being rotatably mounted on said casing in a position adapted to work the soil between said groups of tools, and means, including a gear mounted on said shaft within said casing medially of said separate tools, and gears disposed on each side of said first named gear, cooperating with said separate tools and with said driving mechanism for rotating each of said separate tools about an axis extending in a direction substantially at right angles to the axis of said shaft, said separate tools being so constructed and arranged with respect to said casing that a furrow will be plowed of a width greater than the width of said casing and of a depth sufficient to permit said casing to enter said furrow thereby preventing the casing and tilling tools from being lifted out of the ground during operation.

2. In a rotary soil working device of the character described, comprising a casing having a shaft transversely extending through the bottom thereof, a sprocket wheel mounted on said shaft within said casing and having a driving chain thereon connected to a driving mechanism cooperatively associated with said device, a spiral gear secured to the shaft on each side of the sprocket wheel within the bottom of said casing, a downwardly inclined shaft extending through the casing on each side of the sprocket wheel and in advance thereof, a spiral gear secured to each downwardly-inclined shaft within the casing, said last named spiral gears respectively being meshed with said first named spiral gears on each side of said sprocket wheel, a rotary drill-like soil working tool secured to the end of each downwardly-inclined shaft outside of said casing, a group of soil working tools mounted on each side of said tranverse shaft and adapted to rotate therewith to till the soil on opposite sides of said drill-like tools, said drill-like tools being adapted to rotate in opposite directions to hold the entire device in alignment with respect to the direction in which it is being operated; said separate tools being so constructed and arranged with respect to said casing that a furrow will be plowed of a width greater than the width of said casing and of a depth sufficient to permit said casing to enter said furrow thereby preventing the casing and tilling tools from being lifted out of the ground during operation.

CADWALLADER W. KELSEY.

REFERENCES CITED

The following references are of record in the file of this patent:

UNITED STATES PATENTS

| Number | Name | Date |
|---|---|---|
| 1,773,672 | Grim | Aug. 19, 1930 |
| 2,366,626 | Kelsey | Jan. 2, 1945 |

FOREIGN PATENTS

| Number | Country | Date |
|---|---|---|
| 286,315 | Germany | Aug. 3, 1915 |